United States Patent
Wahren

[11] Patent Number: 6,092,645
[45] Date of Patent: Jul. 25, 2000

[54] CONVEYOR BELT CONSTRUCTION

[76] Inventor: Bertil Wahren, Nygårdsplatån 107, 610 70 Vangnhärad, Sweden

[21] Appl. No.: 09/029,658
[22] PCT Filed: Sep. 2, 1996
[86] PCT No.: PCT/SE96/01085
 § 371 Date: Mar. 24, 1998
 § 102(e) Date: Mar. 24, 1998
[87] PCT Pub. No.: WO97/09252
 PCT Pub. Date: Mar. 13, 1997

[30] Foreign Application Priority Data

Sep. 8, 1995 [SE] Sweden ................................ 9503095

[51] Int. Cl.[7] .................................................. B65G 15/34
[52] U.S. Cl. .......................................... 198/847; 198/821
[58] Field of Search ....................... 198/847, 821

[56] References Cited

U.S. PATENT DOCUMENTS

| | | | |
|---|---|---|---|
| 381,456 | 4/1888 | Woodbury | 198/821 |
| 599,926 | 3/1898 | Bowers | 198/821 |
| 707,355 | 8/1902 | Ridgeway | 198/847 |
| 1,100,654 | 6/1914 | Church | 198/821 |
| 1,484,248 | 2/1924 | Austin | 198/847 |
| 2,121,650 | 6/1938 | Berman et al. . | |
| 2,303,762 | 12/1942 | Reimel et al. | 198/847 |
| 2,748,044 | 5/1956 | Seiler | 198/487 |
| 2,875,116 | 2/1959 | Smith . | |

FOREIGN PATENT DOCUMENTS

| | | |
|---|---|---|
| 0 142 716 A2 | 5/1985 | European Pat. Off. . |
| 41 13 627 A1 | 10/1992 | Germany . |
| 63-47214(A) | 2/1988 | Japan . |
| 1694443-A1 | 11/1991 | U.S.S.R. . |

Primary Examiner—Joseph E. Valenza
Assistant Examiner—Kenneth W. Bower
Attorney, Agent, or Firm—Burns, Doane, Swecker & Mathis, L.L.P.

[57] ABSTRACT

A conveyor belt intended for use as an endless conveyor path in a materials transporting system includes an upper ply, a load-absorbing intermediate ply, and a lower ply that provides wear protection against one or more belt supporting devices. The intermediate ply includes a load-absorbing fabric. The upper ply provides protection against wear by transported goods. The upper ply has at least one of sufficient softness and formfactor to take up shear forces acting in the belt, the shear forces being caused by a load exerted on the belt by the goods transported thereby upon retardation and acceleration of the belt and also by coaction of the belt with the belt supporting devices. The conveyor belt is an endless conveyor path for one or more paper rolls. The conveyor belt is positioned flush with a surrounding floor surface. The upper ply is in abutment with the paper roll and has at least one of elastic properties, hardness and thickness to be able to take-up acceleration and retardation forces acting between the belt and an outer layer of the paper roll without appreciable stretching of material in the upper ply. The upper ply includes an elastic layer covered with an outer, less elastic material.

24 Claims, 3 Drawing Sheets

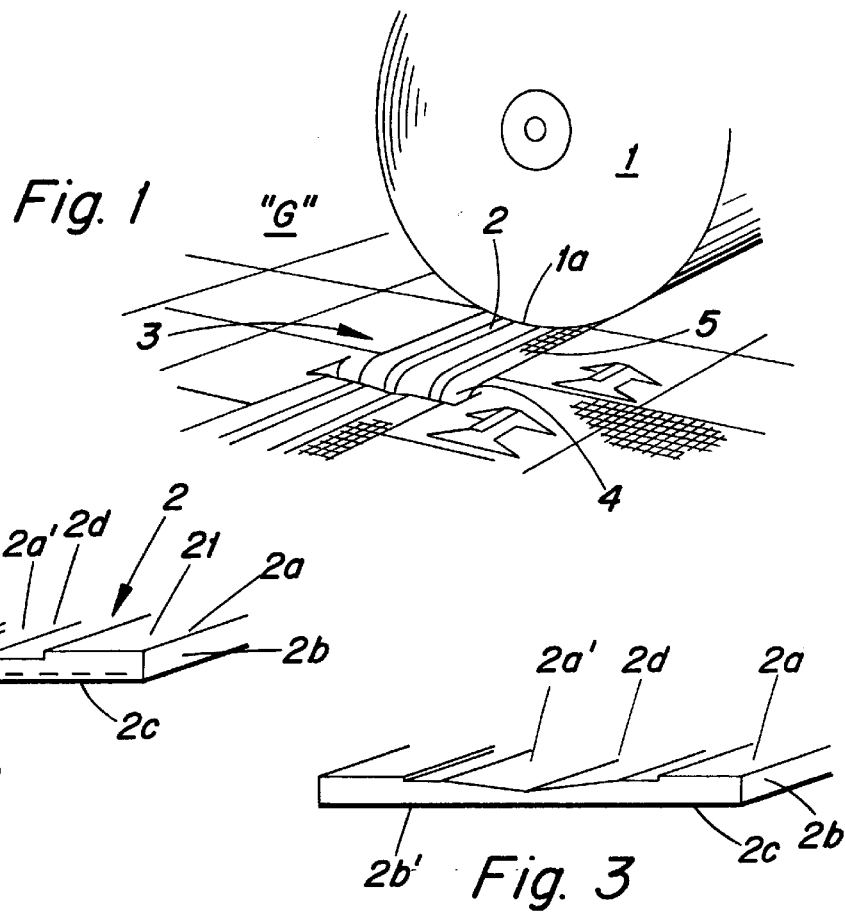
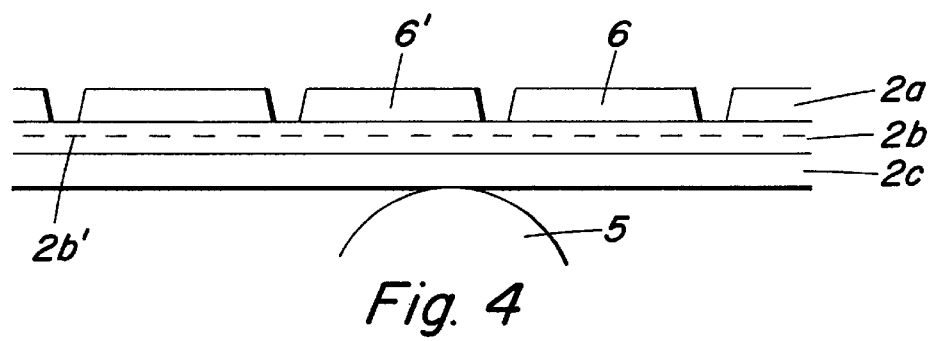

CONVEYOR BELT CONSTRUCTION

FIELD OF INVENTION

The present invention relates primarily to a conveyor belt and more particularly, but not exclusively, to a conveyor belt that can be included as an endless conveyor path.

Such conveyor belts will normally comprise an upper ply, a load-absorbing intermediate ply and a bottom ply.

By "ply" is meant here a layer of material, such as rubber or like material that has unitary properties.

By "layer" is meant here a layer of material such as rubber or the like that has unitary properties, where a layer will normally be thinner than a "ply".

Thus, it is possible within the scope of the invention for a "ply", as used here, to include a number of layers.

The boundaries between "layer" and "ply" will vary in the practical application of the invention.

The construction of conveyor belts of this particular kind can be generalized by saying that even though the entire cross-section of the belt exhibits homogenous properties, the cross-section can nevertheless be considered to consist of a plurality of integrated plies for the sake of simplicity. A bottom ply will then be dimensioned and adapted as a wear protector which protects the belt against wear from one or more belt-supporting devices, such as belt-supporting and belt-deflecting rollers, an intermediate ply which includes an integrated load-absorbing fabric structure, such as a carcass, cord structure or the like and an upper ply which is adapted to protect against wear by transported goods or the like.

When the conveyor belt is an endless belt, the bottom ply will have an inwardly facing wear surface which runs along support rollers and belt-deflecting rollers and which generates together with a drive roller sufficient friction to drive a loaded conveyor belt with only a small amount of belt slipping.

The upper ply has an outwardly facing wear surface which supports the goods and material being conveyed and which generates sufficient friction against the goods or material to cause said goods or material to accompany the belt as it moves.

The load-absorbing fabric structure in the intermediate ply is dimensioned to take-up the tensile forces that act in the belt when in operation, and primarily to take-up those forces and loads that occur when starting a loaded conveyor belt and accelerating the belt to a normal conveyor speed.

The intermediate ply may conveniently be dimensioned and consist of a material that has a high degree of hardness, for instance a hardness above 65° Shore A, and a high modulus of elasticity or E-modulus, because the bending forces are small and material in or adjacent to the bending axis does not need to have a high degree of elasticity.

Conveyor belts of the aforesaid kind find use in many different applications. However, the inventive conveyor belt has been developed primarily for its inclusion as an endless conveyor path for conveying paper rolls comprising rolled-up paper webs, where the conveyor belt is positioned flush with or at least in the close proximity of a surrounding floor surface.

DESCRIPTION OF THE BACKGROUND ART

Several different types of conveyor belts constructed of several plies and/or layers are known to the art.

A common feature of these known conveyor belts is that respective plies and/or layers are normally comprised of rubber or a like flexible/pliable material, and that the plies and layers are firmly bonded to one another, preferably integral with one another.

Thus, it can be mentioned that Patent Publication SD-A1-1 694 443 teaches a conveyor belt which comprises a central flexible ply (3) which is reinforced longitudinally with two outer rubber protectors (1) which are mutually separated with the aid of an intermediate ply provided with cord reinforcements (2).

It is proposed in this publication that the centre ply shall be thicker than the remaining plies.

The European Patent Specification 0 142 716 teaches a conveyor belt that comprises different materials in different plies. The belt is comprised of an uppermost supportive ply 12 which shall have a hardness of 85°–100° Shore A, a second ply 9 which shall have a hardness of 50°–70° Shore A, and a third ply 10 which shall have a hardness of 20°–50° Shore A.

The plies are thus arranged so that the ply that has the highest degree of hardness is located uppermost in the belt and the ply that has the lowest degree of hardness is located lowermost therein.

Japanese Patent Publication JP-63-47 214 teaches an elastic conveyor belt 1 which is comprised of a central rubber material 2 functioning as an elastic element, and outer layers 3 which function as reinforcing surfaces.

U.S. Pat. No. 2,875,116 also teaches a multiply conveyor belt which is adapted for use in electronic heating apparatus.

The U.S. Pat. No. 2,121,650 also teaches a multi-ply conveyor belt whose upper load-carrying surface is in the form of a rubber ply 7 and a plurality of load-absorbing plies 8.

A plurality of such plies are shown together with a ply 10 which represents the rubber ply that is intended to face towards the support rollers in an endless conveyor path.

With regard to the application to which the invention especially refers, it is known to use a conveyor system of the kind illustrated schematically in FIG. 1 that has an endless conveyor belt with a cross-section according to the embodiment illustrated in FIG. 2 or FIG. 3.

It can be mentioned here that the conveyor belt comprises an homogenous material having a hardness of about 65° Shore A.

The belt has a thickness of up to 20 mm and a width of 400 to 500 mm.

The load-absorbing ply of integrated fabric structure is located slightly beneath a centre line of the belt cross-section.

Other examples of earlier known conveyor belt constructions are found in Patent Publications DE-A1-4 113 627, Derwents Abstract 92-355870/43, Derwents Abstract 87-169084/24 and Patent Abstract of Japan, Vol. 15, No. 53 (M-1079).

SUMMARY OF THE PRESENT INVENTION

Technical Problems

When considering the earlier standpoints of technique as described above, and with special consideration to the application shown in FIG. 1, it will be seen that a technical problem is one of safely transporting heavy goods or material and goods or material that are fragile or easily torn, at least with regard to their outer layer, and which are liable to be damaged by the stretching and contraction to which the upper goods-supporting surface of the belt is subjected during the transportation of goods, and particularly in conjunction with belt acceleration and belt retardation sequences, and also in conjunction with the forces to which the bottom ply of the belt is subjected through coaction of the belt with the support rollers, without the goods or material being damaged.

Another technical problem is one of providing a conveyor belt construction which in addition to being well dimensioned to take-up the forces that act longitudinally or horizontally on the conveyor belt, particularly the forces that occur in belt acceleration sequences, also allows the upper goods-supporting surface not to be influenced, or at least only negligibly influenced, by longitudinal displacements occurring within the intermediate ply.

Another technical problem is one of providing a conveyor belt in which its goods-supporting surface or layer is firmly joined to the intermediate force-absorbing ply through the medium of a force transferring, markedly elastic ply such that longitudinal displacement of said surface will be negligible.

In an application wherein the transported goods have the form of paper rolls comprised of rolled-up paper webs wherein the outer paper layer has only a very small stretch capacity, whereas the conveyor belt material is more elastic, a technical problem resides in providing conditions for observing and distributing those forces that act between the uppermost surface of the conveyor belt and the outer layer of the paper roll, particularly in conjunction with the occurrence of belt acceleration and/or belt retardation forces, so as to enable the subsequent changes in dimensions of said surface to be reduced or eliminated, said change being liable to tear the outermost layer of the paper roll and cause wear on the uppermost surface layer of the conveyor belt.

It will also be seen that a technical problem resides in creating conditions with the aid of simple means whereby the aforesaid drawback is overcome, the fundamental reason for the drawback being due to the fact that the uppermost layer of the conveyor belt is more elastic than the paper and that occurrent relative movement and prevailing weight cause the outer layer of the paper to tear or rupture by virtue of being stretched beyond its stretch limit by relative movement of the conveyor belt.

With regard to the transportation of paper rolls on an endless conveyor belt that is supported at least in its goods transporting section by closely positioned support rollers that extend transversely to the direction of belt movement, a technical problem resides in providing conditions for equalizing the force concentration that occurs on the paper roll adjacent each support roller, this force wandering along the belt-facing bottom part of the paper roll during transportation of said roll.

It will also be seen that a technical problem resides in providing a materials transporting arrangement which enables the transportation of paper rolls weighing from 0.5 to 5.0 tonnes and having a length of up to 5 meters on a conveyor belt that has a width of 400 to 500 mm and moves at a speed of least more than 0.1 m/s and where the conveyor belt is often stopped and started, for instance at one and the same frequency, wherein each start and/or stop of the belt results in stretching and contracting of the belt respectively.

It will also be seen that a technical problem resides in realizing the possibilities that are afforded when the uppermost belt ply in abutment with the paper roll is constructed to enable said ply to take-up shear forces that occur in the belt as a result of retardation and acceleration of the belt and its coaction with said belt supporting devices, without appreciably stretching the material in the outer ply in abutment with the outer layer of the paper roll.

Another technical problem is one of realizing that a belt that has such properties can be obtained by providing an upper ply that comprises ridges which have a force-absorbing surface part and each of which is defined or delimited by two side-surfaces.

In conjunction herewith, another technical problem is one of realizing the importance of two mutually adjacent ridges being spaced apart to an extent such that outward bulging of said side-surfaces caused when said ridges are subjected to a given load as a result of the chosen construction of said ridges and a chosen elastic modulus of the ridge material will not cause a ridge side-surface to come into contact with a side-surface of an immediately adjacent ridge and therewith limit outward bulging of said side-surface.

It will also be seen that a technical problem is one of adapting the length, height and width dimensions of the ridges so that the ply comprised of said ridges will exhibit the desired properties, and how these dimensions shall be adapted to a given load and to the elastic modulus of the material from which the ridges are formed, so as to obtain a desired form factor and therewith a desired degree of elasticity of the formed ridges.

Another technical problem is one of realizing that a conveyor belt having such properties can be obtained by forming the upper ply from a very soft or elastic material, such as a rubber ply or rubber layer between a force-absorbing intermediate belt ply or core and an upper paper roll supporting layer or surface.

It will also be seen that a technical problem resides in realizing the significance of giving the elastic rubber ply a high modulus of elasticity in comparison with the modulus of elasticity of the intermediate load-absorbing rubber ply and also an upper wear layer when present.

It will also be seen that a technical problem is one of realizing the advantages that are associated with allowing the intermediate ply to be stretched and contracted without transferring a surface-related change in length to an upper covering layer or an upper surface, or of allowing such transfer only to a negligible extent, therewith fully eliminating appreciable stretching of the paper in the paper roll or at least keeping stretching within the relevant stretch limit, and also to provide conditions for surface-wise distribution of punctilinear stresses on the underside of the conveyor belt created by the support rollers.

It will also be seen that a technical problem is one of realizing the significance of constructing the upper ply from two plies and/or layers, of which one ply or layer is comprised of a material having a hardness of 30°–55° measured in degrees Shore A, and a covering layer comprising a material that has a higher elastic modulus and greater hardness, said layer functioning as mechanical protection for the underlying elastic ply or layer.

It will also be seen that a technical problem is one of realizing the significance that a chosen thickness for the uppermost ply must be increasing with an increasing anticipated load or force, and to ensure that loading of the elastic ply is adapted within the "rectilinear" elasticity range.

It will also be seen that a technical problem resides in realizing the significance of allowing the uppermost ply to be thicker along its edges and the outer parallel edges of the conveyor belt.

It will also be seen that a technical problem is one of realizing the significance of forming the lowermost ply from a material whose elastic modulus is greater than and/or whose hardness, in the order of 70°–75° Shore A, is greater than the material in the intermediate ply, and of forming the uppermost ply from a material which has a lower elastic modulus than and/or a lower hardness than the material in the lowermost ply.

It will also be seen that a technical problem is one of realizing the significance of covering the uppermost ply with a layer of material whose elastic modulus and/or hardness corresponds to that of the material in the lowermost ply.

Solution

With the intention of solving one or more of the aforesaid technical problems, the present invention takes as its starting point a conveyor belt for inclusion as an endless path in a materials transporting arrangement, wherein the belt includes an upper ply, a load-absorbing intermediate ply, and a lower ply which functions as a wear protector against the effect of one or more belt-supporting devices, wherein the intermediate ply includes a load-absorbing fabric structure or the like, and wherein the upper-ply is adapted to function as a wear protector against the wearing effect of the goods or materials transported by the belt.

In accordance with the present invention, the uppermost belt ply in abutment with the transported materials is constructed in a manner such that said ply is able to take-up shear forces acting in the belt and occurring in response to belt retardation, belt acceleration and in conjunction with the forces exerted by the belt supporting devices, without appreciable stretching of the material in the surface layer in abutment with the outer layer of the transported goods or materials.

In accordance with the present invention, the conveyor belt has an uppermost ply that has well adapted properties.

According to one preferred embodiment, the upper belt ply is comprised of ridges, each having an adapted distance to adjacent ridges.

The ridges are preferably parallel with one another, although other orientations are feasible.

These ridges are defined by and allotted a load-absorbing surface and two adjacent side-surfaces.

According to the invention, the distance between two mutually adjacent ridges shall at least be sufficient to enable the side-surfaces to bulge outwardly when the ridges are subjected to a selected load by virtue of chosen configuration of the ridges and the elastic modulus of the ridge material, without being limited by contact with a side-surface of an opposing adjacent ridge and by corresponding outward bulging of this side-surface.

The length, width and height dimensions of the ridges must be adapted to the intended load and to the elastic modulus of the ridge material, so that respective ridges will be compressed solely within those regions in which the material exhibits elastic properties.

When subjected to load, the ridges will be compressed by an amount corresponding to 12%, preferably 10%, of the height of respective ridges.

With regard to the aforesaid dimensioning conditions and in the case of the exemplified application in which the ridges are comprised of a material having a chosen elastic modulus that lies between 0.4 and 0.55 MN/m$^2$, the distance between two ridges will be at least 3 mm, preferably 6 mm, and the width of a ridge will be 25 to 35 mm, preferably 30 mm.

A suitable ridge height is 3 to 7 mm, preferably 5 mm.

According to one preferred embodiment of the invention, the upper ply is comprised of two layers, one of which has a hardness of 30°–55° measured in degrees Shore A, and the covering layer comprises a material of lower elasticity and greater hardness.

The purpose of this embodiment is for the softer intermediate ply to take-up those shear forces that would otherwise occur between the upper surface of the conveyor belt and the goods transported thereby.

It is also proposed that a chosen thickness for the uppermost ply will be increasing with an increasing anticipated load or force.

It is also proposed that the uppermost ply will be thicker along its and the conveyor belts's parallel edges.

The invention also proposes the use of such a conveyor belt as an endless path for conveying paper rolls comprised of rolled-up paper webs, where the belt is positioned flush with a surrounding floor surface.

In the case of this application, the uppermost ply and/or layer of the belt that lies in abutment with the roll shall comprise a material of such elasticity and/or hardness and of such thickness that said material is able to take-up acceleration and/or retardation forces that act between said ply and the paper roll without appreciable stretching of the belt material in the surface layers against the paper roll.

It is also proposed that the elastic ply shall be coated with a thin layer of a less elastic material.

It is also proposed that the uppermost ply is covered with a layer of material whose elasticity and/or hardness corresponds to the hardness of the material in the lowermost ply.

Advantages

Those advantages that can be considered most characteristic of an inventive conveyor belt reside in the ability of the upper elastic ply to take-up those elongation forces and shear forces that occur in the core or intermediate ply of the belt as a result of acceleration and/or retardation forces, primarily when starting and stopping the belt, and also in conjunction with the forces exerted by the belt-supporting rollers when the belt is loaded, such that elongation and contraction of the uppermost surface layer of the belt can be minimized and, in practice, caused to lie within the limits required to ensure that transported goods or materials will not be damaged, eg such as the outer layer of a paper roll.

Furthermore, the elastic ply provides surface-wise distribution of point-related stresses created on the lower surface of the belt by the belt-supporting rollers.

It is particularly recommended that the uppermost belt ply shall have ridges which enhance softness or reduce the form factor of this ply.

The primary characteristic features of an inventive conveyor belt are set forth in the characterizing clause of claim 1.

Application of a conveyor belt for transporting paper rolls comprised of rolled-up paper webs is primarily characterized by the features set forth in the characterizing clause of the following claim 18.

BRIEF DESCRIPTION OF THE DRAWINGS

An inventive conveyor belt will now be described in more detail with reference to the earlier standpoint of techniques and with reference to exemplifying embodiments at present proposed and also with reference to the accompanying drawings, in which FIG. 1 is a perspective view of a known conveyor arrangement for conveying paper rolls comprised of rolled-up paper webs;

FIG. 2 is a cross-sectional view in perspective of a first embodiment of a known conveyor belt in current use;

FIG. 3 is a cross-sectional view in perspective of a second embodiment of an earlier known conveyor belt in current use;

FIG. 4 is a cross-sectional side view in perspective of one embodiment of the present invention in which the upper belt ply is comprised of ridges;

FIG. 5 illustrates the dimensions of a load-free conveyor belt according to FIG. 4;

DESCRIPTION OF THE EARLIER STATE OF THE ART

Figure 6:
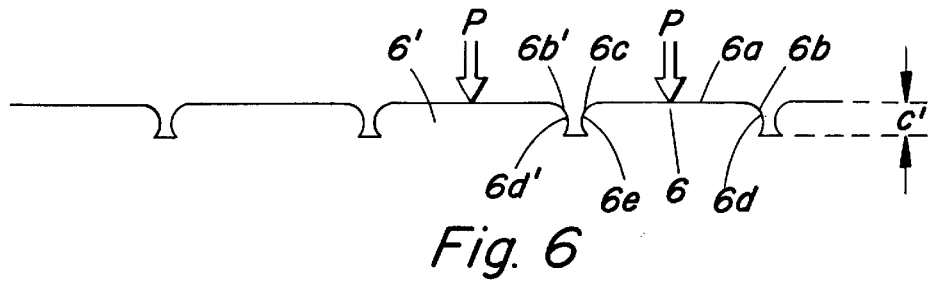
FIG. 6 illustrates a loaded conveyor belt according to FIG. 5.

FIG. 1 is a perspective view of a paper roll 1 comprising a rolled-up paper web, resting with its peripheral and elongated bottom surface part 1a on an endless conveyor belt 2 having a cross-sectional shape which will be described in more detail with reference to FIG. 2.

The conveyor belt 2 is included in a conveyor system 3 that has two belt-deflecting rollers at respective ends thereof, of which only one deflecting roller 4 is shown, and a plurality of closely positioned support rollers 5, which normally have a diameter of 50 mm and which are spaced at the smallest possible distance apart without coming into contact with one another, normally a distance of from 3 to 4 mm.

One of the belt-deflecting rollers is driven by a motor, not shown.

A paper roll 1 formed from a paper web discharged from a paper machine (not shown) is rolled over the floor surface "G" to the conveyor belt 2.

The conveyor belt 2 has raised edges 20, 21, so that the paper roll 1 will rest stably on the conveyor belt 2 between said edges.

The edges 20, 21 are located in or at least close to the plane of the floor surface G.

The conveyor belt 2 used in the conveyor system 3 has an upper ply 2a, an intermediate load-absorbing ply 2b and a bottom ply 2c with the plies integrated with one another.

The combined thickness of the bottom ply 2c and the intermediate ply 2b corresponds to half the total thickness of the conveyor belt, about 20 mm.

The bottom ply 2c is adapted to provide wear protection against the forces exerted by one or more belt-supporting devices in the form of belt-deflecting rollers 4 and belt-supporting rollers 5, and the intermediate ply 2b includes a load-absorbing fabric structure 2b' or like woven structure, whereas the upper ply 2a is adapted to protect the belt against wear from the transported goods or the like, i.e. the paper roll 1.

The upper surface 2a' is irregular and has an extended stepped configuration in cross-section, such that the paper roll 1 is able to lie positioned centrally in a channel 2d in the conveyor belt.

FIG. 3 is a cross-sectional view of another known conveyor belt in which the channel 2d has a wider V-shape as seen in cross-section.

With the exception of the inlaid fabric structure 2b', the earlier known embodiments according to FIGS. 2 and 3 are comprised of an homogenous material and therewith produced from a rubber material having a hardness of 65° Shore A or very close thereto.

One serious drawback with a construction of this kind is that the whole of the conveyor belt 2 will stretch when started from rest and accelerated to full speed, therewith causing the upper surface of the conveyor belt to move relative to the peripheral surface part 1a of the paper roll.

Furthermore, the punctiform forces exerted by the belt supporting rollers 5 will be taken up by small surface areas in the elongated lower surface part 1a of the paper roll.

As paper material has a pronounced small stretch capacity, whereas rubber material has a high stretch capacity, this results in tearing of at least the outer layer of the paper roll.

Another drawback is that when the conveyor belt and the goods conveyed thereon are moved forwards and the front edge of the goods is brought to a position between two support rollers, the belt will be pressed down between the rollers. When the front edge of the goods then reaches a support roller 5, the belt and goods will be lifted up by the support roller. This process creates diverse shear forces in the belt and in the surface between belt and goods.

It has been found that the roll is moved slightly quicker than the belt, such that a paper roll may move from 100 to 150 mm forwards in relation to a conveyor belt while being moved 30 m on the belt. This results in wear on both the paper roll and above all on the conveyor belt.

The object of the invention is to solve these problems.

DESCRIPTION OF PROPOSED EMBODIMENTS

As illustrated in FIG. 4, the present invention provides a conveyor belt 2 of novel construction, which can be described most simply with reference to its cross-section.

The novel construction is based on the old construction and may therefore have a bottom ply 2c comprised of rubber material having a hardness of roughly 75° Shore A, and an intermediate ply 2b comprised of a rubber material having a hardness of 60°–65° Shore A.

The intermediate ply 2b may also include requisite fabric reinforcements or steel cords 2b'. The lowermost ply 2c may conveniently be slightly harder than the ply 2b, so as to obtain the hardest possible underlay against the belt supporting rollers 5 and therewith reduce penetration of the rollers into the belt.

Because the present invention enables for its function the use of materials of different hardness or materials of different elastic moduli, and since practical application of the invention very often requires good adaptation of these material properties, this must be taken into account in respect of the following description, even when only one property is mentioned.

In a first embodiment of the present invention, shown in FIG. 4, the upper ply 2a comprises a plurality of ridges 6, 6'.

The ridges 6, 6' have been given a load-absorbing surface 6a and two sides surfaces 6b, 6c, as shown in FIG. 5.

The purpose of the ridges 6, 6' is that a specific ridge shall support a part of the total load. This load acts to compress the ridge concerned. As the ridges are compressed, their side surfaces 6b, 6c will bulge outwards, 6d, 6e, due to the chosen elastic modulus of the material from which the ridges are comprised and also because of the configuration of the ridges, which together provides a specific form factor or ridge softness.

The so-called form factor F is a measurement of the softness of a body consisting of a given material under load. This parameter is dependent on how large a part of the body is able to bulge-out under load, and also on the elastic modulus $E_m$ of the material from which the body is made. The form factor F can be expressed as $$F = Y_t / Y_f E_m$$

where $Y_f$ is the free surface of the body and $Y_t$ is the covered surface of the body. By covered surface is meant that part of the surface of the body that is unable to bulge-out by virtue of being covered by another body, and by free surface is meant that part of the body which is free to bulge-out under load.

With a specific elastic modulus $E_m$ a body can therefore be allocated different degrees of softness according to how limited the body is in bulging-out under load. The form factor F has the same units as the elastic modulus $E_m$, since the quotient prior to $E_m$ is a unitless constant. The greater the covered surface of the body, the higher the form factor. Analogously with a high elastic modulus, a high form factor thus corresponds to a hard body, whereas a low form factor will correspond to a soft body.

A ridge thus constitutes a body comprised of a material that has a given elastic modulus. The softness of a ridge under load will depend on the configuration and dimensioning of the ridge and also on the extent to which the various surfaces of the ridge are free to bulge-out under load.

When a rubber material is compressed within certain limits and allowed to deform by virtue of outward bulging of free surfaces of the loaded ridge, the material can be displaced laterally in relation to the load to a very great extent and therewith take-up, either totally or partially, those shear forces that would otherwise occur between the upper surface of the conveyor belt and the goods transported thereon. On the other hand, if outward bulging of the material is prevented, the material will behave as a rigid and non-elastic material.

FIG. 6 thus illustrates the case in which the ridges 6, 6' are loaded by a force "P" deriving from a piece of goods transported by the conveyor belt, wherein the ridges are compressed and the side surfaces 6b, 6c bulge outwardly at 6d, 6e.

In order not to limit outward bulging 6d, 6e of the side surfaces, the distance "b" between two mutually adjacent ridges 6, 6' will be at least sufficient to avoid contact between one side surface 6c of one ridge 6 and an opposing side surface 6b' of an adjacent ridge 6' as respective side surfaces bulge outwards under a load "P" on the ridges.

In the region of the ridge on which a load is exerted by transported goods, the ridges shall have a height "c" and an extension "a" in the direction of belt movement, wherewith a ridge compressed under load "P" will have a height "c'" where said compression corresponds to up to 12%, preferably 10%, of the height "c" of a ridge that is not subjected to load.

Rubber material will retain its elastic properties even when subjected to load, provided that the material is not compressed by more than 12% of its height when under load. When compressed to a greater extent than 12%, the material looses its elastic properties and is therewith no longer resilient.

Under the conditions applicable in the transportation of paper rolls, the aforesaid distance "b" between two ridges shall be at least 3 mm, preferably 6 mm.

Under the same conditions, the extension "a" of the ridges may be 25 to 35 mm, preferably 30 mm, and the height "c" of the ridges may be 3 to 7 mm, preferably 5 mm.

These dimensions are greatly dependent on the given loading of the ridges and on the given elastic modulus of the material from which the ridges are comprised.

The dimensions given above by way of example with regard to the height, width and mutual spacing of the ridges, together with a material that has an elastic modulus in the range of 0.4–0.55 $MN/m^2$, will result in compression of the ridges to an extent corresponding to about 0.5 mm of the ridge height. This compression lies within the 12% limit, which is necessary in order for the material to retain its elasticity. A compression of 0.5 mm with an elastic modulus of about 0.48 $MN/m^2$ will give the desired resiliency from ridge to load.

If higher ridges are chosen, this would mean that a smaller relative compression can be used to obtain the same resiliency from ridge to load. However, it is desirable to keep the upper ply 2a as thin as possible so as to enable the invention to be applied with existing conveyors, meaning that thinner ridges are desirable.

The above dimensioning examples are applicable provided that the transported goods are paper rolls having a diameter of 1.8 to 2 meters. The length of the rolls is not critical, since each ridge is only loaded by its individual part of the paper roll. The ridges will preferably be given other dimensions when subjected to a different load or when comprised of a different material.

There is nothing to prevent an inventive conveyor belt being comprised of material that has a completely different elastic modulus and ridges of completely different dimensions and using this conveyor belt in new conveyor installations, for instance, or in other applications and in respect of other loads to those shown by way of example in the illustrated embodiments.

The aforedescribed dimensions apply generally to the centre of the conveyor belt where the ridges are subjected to load by the transported goods.

Figure 7:
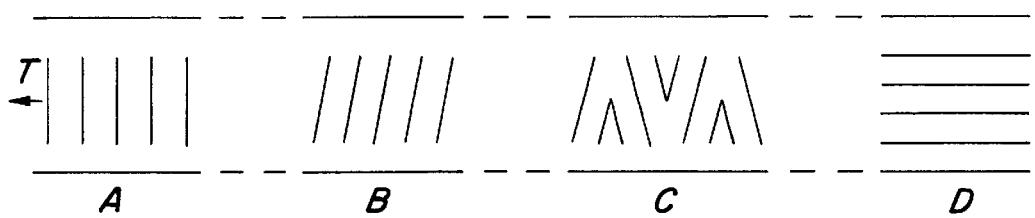
FIG. 7 illustrates that the formed ridges need only extend over a part of the width of the belt, and also shows a number of possible ridge-forming patterns on a conveyor belt according to a first embodiment of the invention.
Figure 9:
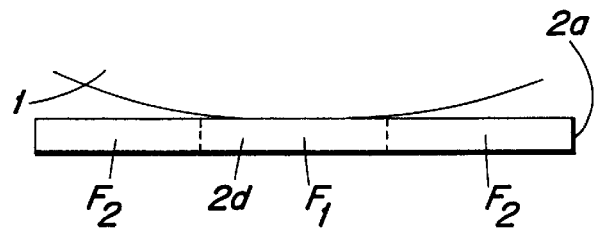
FIG. 9 shows how a channel shape is formed when the ridges are subjected to load.

The requisite channel configuration 2d shown in FIGS. 2 and 3 can be obtained by solely forming ridges in that part of the belt which is subjected to load by the transported goods, as shown in FIG. 7. This involves providing the uppermost ply of the belt 2a with a rising form factor, such that the belt will be harder out towards its edges, wherewith the paper roll 1 (according to FIG. 9) will compress the ridges along the belt centre line, where the belt has a first form factor $F_1$, whereas the material out towards the edges of the ridges will have a second, higher form factor $F_2$ and will therewith not be compressed so easily. This results in the formation of a channel 2d when the ridges are subjected to load.

Figure 8:
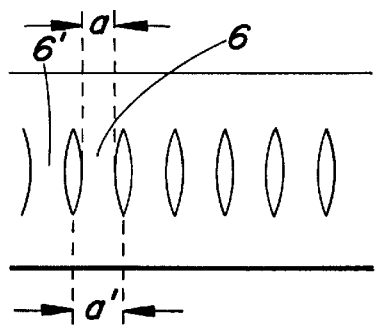
FIG. 8 shows an alternative embodiment and illustrates how the width of the ridges may vary along their longitudinal extensions.

FIG. 8 shows that the width "a" of the ridges 6, 6' can increase successively from the centre of the belt to obtain a greater width "a'" out towards the edges of the belt. This also results in a channel formation when loading in accordance with FIG. 9, since the ridges are therewith allocated a higher form factor out towards the edges than in the centre.

In the case of the embodiments illustrated in FIGS. 7 and 8, the non-loaded upper belt surface is parallel with the lower surface, since the channel 2d is only formed under load. This means that more material is available under the load than in the case when a channel is formed from the existing upper ply in accordance with known techniques. An inventive conveyor belt, including its various alternative embodiments, provides the desired damping effect with the same total belt thickness as the thickness used in known conveyor belts shown in FIGS. 2 and 3.

Figure 10:
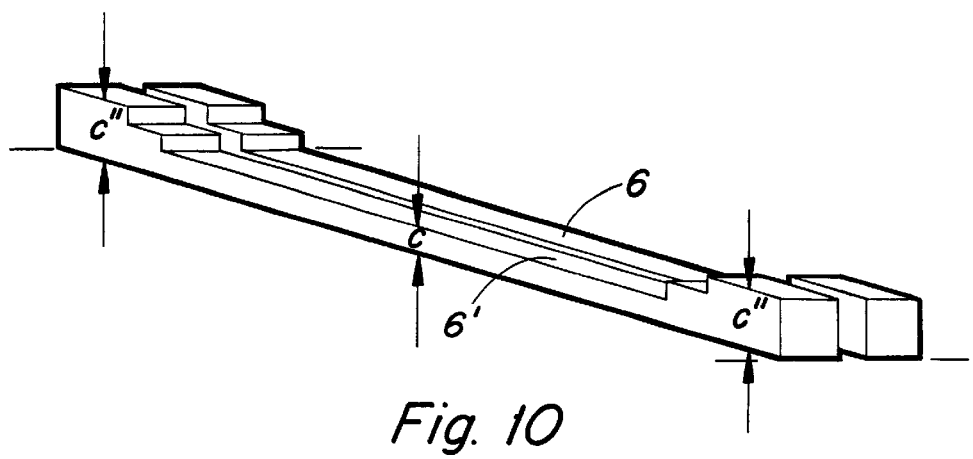
FIG. 10 is a perspective view showing possible height distribution of a ridge.

It also lies within the scope of the invention to allocate ridges to the belt over the whole of its width and to allow the height of the ridges to increase to a greater height in a V-shape, either in steps (shown in FIG. 10) or in a slightly curved form from the centre of the belt out towards the outer edges thereof and therewith create the channel 2d, which is also shown in FIGS. 2 and 3. FIG. 10 shows how two ridges 6, 6' increase from a height "c" in the centre of the belt to a greater height "c'" at the outer edges of the belt.

Under the aforesaid conditions, a compressed ridge 6, 6' will have the desired properties of being able to take-up the shear forces acting in the belt, these forces occurring as a result of a load "P" exerted on the ridges by the transported goods when the belt is slowed down and accelerated and also by the coaction of the belt with said belt supporting devices 5, without appreciable stretching of the material in the outer layer against the part of the outer layer of the transported goods that supports against the ridges.

Figure 11:
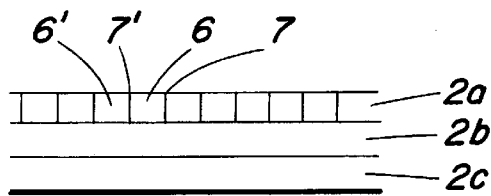
FIG. 11 shows an alternative embodiment in which the ridge spacing is 0 mm.

FIG. 11 illustrates a further embodiment of the invention in which the distance between the ridges is 0 mm, implying that the surface forms the upper ply 2a and constitutes a single ply, totally or partially, comprising slits 7, 7' and ridges 6, 6'. The side surfaces of each ridge thus lie in direct contact with the side surfaces of adjacent ridges. The distance between the slits, and therewith the width of the ridges, can be chosen differently in keeping with the desired softness.

This embodiment provides no opportunity for outward bulging of the side surfaces, and hence the form factor, and therewith the hardness; of the upper ply 2a increases.

However, the ply obtains a certain degree of softening as a result of movement between each ridge defined by respective slits 7, 7' in the slotted ply.

FIG. 7 shows that positioning of the ridges in the belt can be chosen in different ways. Reference "A" indicates that the ridges can be positioned with a perpendicular extension relative to the transport direction "T" of the belt. The references "B" and "C" also show that the ridges can also be orientated at other angles relative to the transport direction "T" of the belt. It is also conceivable for the ridges to be orientated in the transport direction "T" in accordance with reference "D". The ridges in FIGS. 4–6 are orientated in accordance with "A".

The best orientation of the ridges theoretically is the orientation designated "A". Other orientations will provide a desired technical effect, although not to the same extent.

Figure 12:
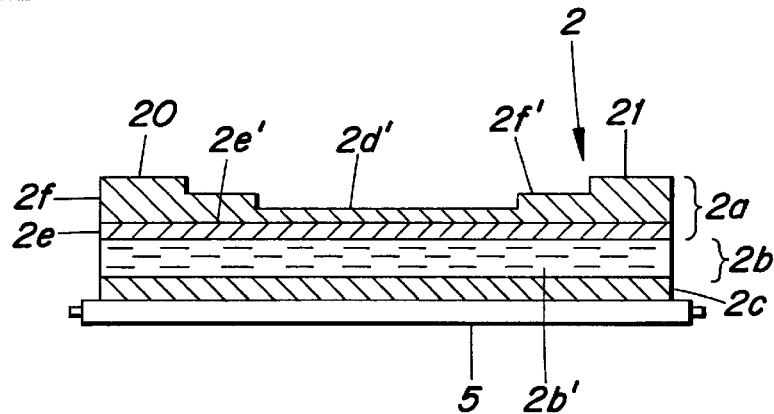
FIG. 12 is a sectional view of a second embodiment of an inventive conveyor belt.

FIG. 12 illustrates a further embodiment of the invention. This embodiment is based on the concept that one or more upper plies and/or layers 2a positioned on top of the intermediate ply shall comprise totally or partially of a layer of material whose elasticity exceeds the elasticity of the materials in remaining layers and has a hardness of 30°–55° Shore A.

The plies 2b and 2c can thus be comprised of a rubber material having a hardness of 65° Shore A and an elastic modulus of from 1.0 to 1.5 MN/m².

The ply 2e can be comprised of rubber material having a hardness of 30°–35° Shore A, more particularly between 40° and 50° Shore A, at a thickness of about 6 mm and with an elastic modulus of from 0.4 to 0.8 MN/m², such as between 0.4 and 0.55, e.g. 0.48 MN/m² and thereabouts.

In the following description, this latter ply 2e or the layers required to build-up the ply, is referred to as being "elastic", since the ply or its layers are comprised of material which has a lower elastic modulus than the remaining plies.

In the illustrated case, the bottom ply 2c is comprised of a 3 to 5 mm thick ply placed against the intermediate ply 2b with an upper ply 2f placed over an elastic ply or layer 2e.

It lies within the scope of the invention to increase the thickness of the elastic ply or layer 2e, so that its top surface 2e' will be located at the marked surface 2d' such as to leave two edge-related ridges 20, 21 which are comprised of a hard material and which function to centre the paper roll 1.

Figure 13:
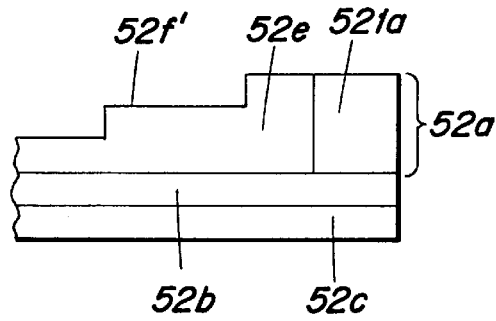
FIG. 13 is a sectional view of an enlarged edge-related part of a third embodiment of an inventive conveyor belt.

FIG. 13 illustrates another alternative in which the elastic ply 52e may be given a form corresponding to both the layer 2e and the layer 2f in FIG. 12.

In the FIG. 13 embodiment, edge-related parts or supports 521a are comprised of a harder material than the elastic ply 52e.

Figure 14:
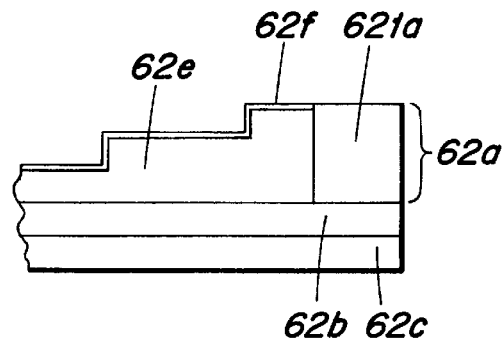
FIG. 14 is an enlarged sectional view of an edge-related part of a fourth embodiment of an inventive conveyor belt.

FIG. 14 illustrates an embodiment in which a thin layer 62f of a more non-elastic and harder material is applied over the elastic ply or layer 62e as mechanical protection. Thus, FIG. 14 illustrates an embodiment in which edge-related parts 621a are comprised of a material which is more inelastic than the material in the ply 62e.

Figure 15:
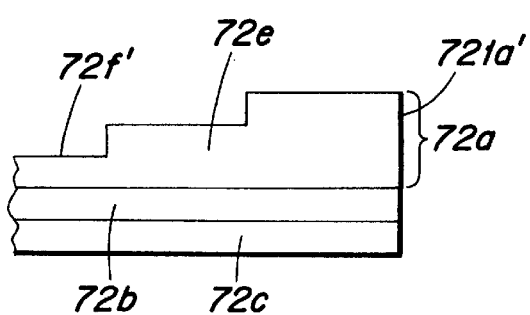
FIG. 15 is an enlarged sectional view of an edge-related part of a fifth embodiment of an inventive conveyor belt.

The embodiment illustrated in FIG. 15 has an elastic ply 72e consisting of a material having a chosen hardness which successively increases and a chosen elasticity which successively decreases towards the edges 721a'.

When either the conveyor belt according to FIG. 14 or the conveyor belt according to FIGS. 13–15 is used in a materials handling system according to FIG. 1, it is evident that the uppermost layer or surface 2f, 52f, 62f, 72f in contact with the paper roll shall be comprised of an elastic and/or adapted hard material and shall have a thickness such that the material 2e, 52e, 62e, 72e is able to take-up acceleration and/or retardation forces acting between the intermediate ply and the paper roll without any appreciable stretching of the material in the surface layer 2f, 52f, 62f, 72f against the paper roll, since these forces will be taken-up by elastic deformation of the actual layer 2e, 52e, 62e, 72e.

It lies within the scope of the invention to form the lowermost ply 2c, 52c, 62c, 72c from a material that has a lower elasticity than and/or a greater hardness than the material in the intermediate ply 2b, 52b, 62b, 72b, and to form the uppermost ply 2a, 52a, 62a, 72a from a material that has totally or partially greater elasticity than and/or a much lower hardness than the material in the lowermost ply or layer 2c, 52c, 62c, 72c.

The uppermost ply is also covered with a layer of material having an elasticity and/or hardness corresponding to the hardness of the material in the lowermost layer.

An essential feature of the invention is that when a paper roll 1 is placed on an inventive conveyor belt 2, compression of the elastic ply 2e, 52e, 62e, 72e caused by the weight of the paper roll will, in practice, be less than about 12%, so that the ply 2e, 52e, 62e, 72e will be resilient and therewith distribute punctilinear loads from the belt-supporting rollers 5 over a wider surface area, among other things.

A pressure-loaded ply 2e, 52e, 62e, 72e shall still be able to withstand additional loading forces or corresponding forces whilst retaining its resiliency.

This dimensioning recommendation may be taken to imply that the material thickness within the ply 2e, 52e, 62e, 72e and within the centre part 2d, 52d, 62d, 72d of the conveyor belt shall be thicker than those shown in FIGS. 11–14.

It will be understood that there is nothing to prevent different described embodiments being combined, for instance a combination in which an upper ply is comprised completely or partially of ridges comprising a relatively soft material and provided with a protective covering layer of greater hardness.

It will also be understood that the invention is not restricted to the aforedescribed and illustrated exemplifying embodiments thereof and that modifications can be made within the scope of the inventive concept as defined in the following claims.

What is claimed is:

1. A conveyor belt intended for use as an endless conveyor path in a materials transporting system, the belt comprising:
   an upper ply,
   a load-absorbing intermediate ply, and
   a lower ply adapted to provide wear protection against one or more belt supporting devices,
   the intermediate ply including a load-absorbing fabric structure,
   the upper ply being adapted to provide protection against wear by transported goods, the upper ply of the belt having at least one of sufficient softness and formfactor to take up shear forces acting in the belt, the shear forces being caused by a load exerted on the belt by the goods transported thereby upon retardation and acceleration of the belt and also by coaction of the belt with the belt supporting devices,
   wherein the upper ply includes at least two layers, a first layer of the at least two layers being comprised of a material having a hardness of 30°–55° Shore A, and a second layer, covering the first layer, comprising a material having a higher elastic modulus and greater hardness than the first layer.

2. A conveyor belt intended for use as an endless conveyor path in a materials transporting system, the belt comprising:
   an upper ply,
   a load-absorbing intermediate ply, and
   a lower ply adapted to provide wear protection against one or more belt supporting devices,
   the intermediate ply including a load-absorbing fabric structure,
   the upper ply being adapted to provide protection against wear by transported goods, the upper ply of the belt having at least one of sufficient softness and formfactor to take up shear forces acting in the belt, the shear forces being caused by a load exerted on the belt by the goods transported thereby upon retardation and acceleration of the belt and also by coaction of the belt with the belt supporting devices,
   wherein the conveyor belt is an endless conveyor path for one or more paper rolls and the conveyor belt is positioned flush with a surrounding floor surface, the upper ply being in abutment with the paper roll and having at least one of elastic properties, hardness and thickness to be able to take-up acceleration and retardation forces acting between the belt and an outer layer of the paper roll without appreciable stretching of material in the upper ply, and wherein the upper ply includes an elastic layer covered with an outer, less elastic material.

3. A belt according to claim 2, wherein a thickness of the upper ply is greatest at parallel edges of the belt.

4. A conveyor belt according to claim 2, wherein the lowermost ply comprises a lowermost ply material having at least one of lower elasticity and greater hardness than an intermediate ply material, and the upper ply comprises an upper ply material having at least one of higher elasticity and lower hardness than the lowermost ply material.

5. A conveyor belt according to claim 4, wherein the upper ply is covered with a layer having at least one of elasticity and hardness corresponds to the elasticity and the hardness of the lowermost ply.

6. A belt according to claim 1, wherein the upper ply is comprised at least partially of ridges.

7. A belt according to claim 6, wherein the ridges each have a load-absorbing surface and two side-surfaces.

8. A belt according to claim 2, wherein solely a central part of a width of the belt is provided with ridges.

9. A belt according to claim 8, wherein a length of each of the ridges in a longitudinal direction of the belt is constant.

10. A belt according to claim 8, wherein a length of the ridges is shorter in a longitudinal direction of the belt toward edges of the belt than toward a center of the belt.

11. A belt according to claim 8, wherein a height of the ridges is greater toward edges of the belt than at a center of the belt.

12. A belt according to claim 2, wherein ridges are provided across a full width of the belt.

13. A belt according to claim 12, wherein a length of the ridges is shorter in a longitudinal direction of the belt toward edges of the belt than toward a center of the belt.

14. A belt according to claim 12, wherein a height of the ridges is greater toward edges of the belt than at a center of the belt.

15. A belt according to claim 2, wherein the ridges have a load absorbing surface and two side surfaces, and a distance between two adjacent ridges is at least sufficiently large to avoid contact between one side surface of one ridge and an opposing side surface of an adjacent ridge as a result of outward bulging of the side surfaces when the ridges are subjected to a normal load.

16. A belt according to claim 15, wherein the distance between adjacent ridges is at least 3 mm.

17. A belt according to claim 15, wherein an elastic modulus of material forming the ridges is 0.4 to 0.55 $MN/m^2$.

18. A belt according to claim 2, wherein at least some of the ridges are compressible up to at least 10% of a height of the ridges.

19. A belt according to claim 18, wherein an elastic modulus of material forming the ridges is 0.4 to 0.55 $MN/m^2$.

20. A belt according to claim 18, wherein a height of each ridge is 3 to 7 mm.

21. A belt according to claim 20, wherein a height of the ridges is greater toward edges of the belt than at a center of the belt.

22. A belt according to claim 18, wherein a length of each ridge in a longitudinal direction of the belt is between 25 and 35 mm.

23. A belt according to claim 22, wherein a length of each of the ridges in a longitudinal direction of the belt is constant.

24. A belt according to claim 22, wherein a length of the ridges is shorter in a longitudinal direction of the belt toward edges of the belt than toward a center of the belt.

\* \* \* \* \*